(12) United States Patent
Martinelli et al.

(10) Patent No.: US 9,029,447 B2
(45) Date of Patent: May 12, 2015

(54) THERMOPLASTIC RESIN COMPOSITION COMPRISING A MIXTURE OF SLIP AGENTS AND A MONO-OR CO-EXTRUDED, LAMINATED OR NON-LAMINATED FILM

(75) Inventors: Adriana Benetti Martinelli, Porto Alegre (BR); Fabio Agnelli Mesquita, Sao Paulo (BR)

(73) Assignee: Braskem S.A., Camacari—BA (BZ)

( * ) Notice: Subject to any disclaimer, the term of this patent is extended or adjusted under 35 U.S.C. 154(b) by 22 days.

(21) Appl. No.: 13/997,760

(22) PCT Filed: Dec. 30, 2010

(86) PCT No.: PCT/BR2010/000437
§ 371 (c)(1),
(2), (4) Date: Sep. 12, 2013

(87) PCT Pub. No.: WO2012/088567
PCT Pub. Date: Jul. 5, 2012

(65) Prior Publication Data
US 2013/0345349 A1 Dec. 26, 2013

(51) Int. Cl.
*C08K 5/20* (2006.01)
*B32B 27/18* (2006.01)
*C08J 5/18* (2006.01)
*B32B 27/08* (2006.01)
*B32B 27/32* (2006.01)

(52) U.S. Cl.
CPC . *C08K 5/20* (2013.01); *B32B 27/18* (2013.01); *C08J 5/18* (2013.01); *C08K 2201/014* (2013.01); *B32B 27/08* (2013.01); *B32B 27/32* (2013.01); *B32B 2250/05* (2013.01); *B32B 2250/242* (2013.01); *B32B 2307/746* (2013.01); *B32B 2439/00* (2013.01); *C08J 2323/04* (2013.01); *C08J 2323/10* (2013.01)

(58) Field of Classification Search
CPC .............. C08K 5/20; B32B 27/18; C08J 5/18
USPC ..................... 526/71; 524/229, 210
See application file for complete search history.

(56) References Cited

U.S. PATENT DOCUMENTS 6,497,965 B1 * 12/2002 Longmoore et al. .......... 428/515
7,267,862 B1 * 9/2007 Burke et al. .................. 428/212

* cited by examiner

*Primary Examiner* — Michael M Bernshteyn
(74) *Attorney, Agent, or Firm* — Duane Morris LLP

(57) ABSTRACT

The purpose of the present invention is to propose a composition of slip additive agents for use in thermoplastic resins, preferably polyolefins, and consequently the presence of this composition on at least one of the layers of mono-extruded or coextruded, laminated or non-laminated films. More particularly, the invention comprehends a composition of additives which comprises at least one primary amide of the generic formula R—CO—$NH_2$ and a secondary amide of the bis amide type of the generic formula R'—CO—NH—$CH_2$—$CH_2$—NH—CO—R". Films comprising this composition stand out by achieving Coefficient of Friction (CoF) values lower than 0.35 and particularly by their ability to maintain good control over these values for use in the automated packaging industry.

9 Claims, 2 Drawing Sheets

THERMOPLASTIC RESIN COMPOSITION COMPRISING A MIXTURE OF SLIP AGENTS AND A MONO-OR CO-EXTRUDED, LAMINATED OR NON-LAMINATED FILM

TECHNICAL FIELD

The purpose of the present invention is to propose a composition of slip additive agents for use in thermoplastic resins, preferably polyolefins, and consequently the presence of this composition on at least one of the layers of mono-extruded or coextruded, laminated or non-laminated films. More particularly, the invention comprehends a composition of additives which comprises at least one primary amide of the generic formula R—CO—$NH_2$ and a secondary amide of the bis amide type of the generic formula R'—CO—NH—$CH_2$—$CH_2$—NH—CO—R". Films comprising this composition stand out by achieving Coefficient of Friction (CoF) values lower than 0.35 and particularly by their ability to maintain good control over these values for use in the automated packaging industry.

BACKGROUND OF THE INVENTION

In the automated packaging industry there is required the use of films with coefficient of friction (CoF) values lower than 0.35. For this purpose, there are added to the polyolefins, among other additives, slip agents. The purpose of this class of additives is to facilitate the slipping of the film over its own surface and over the metallic surfaces of the extruders and packaging lines, thereby contributing to an enhancement in productivity.

The slip agents used in the majority of commercially available polyethylene and polypropylene resins are unsaturated primary amides of the types oleamide (C18) and erucamide (C22), which present the advantages of relatively low cost and effectiveness in the sense of promoting the reduction of the CoF values to ≤0.35, a range that is required for use in the automated packaging industry. However, with the use of these additives it is quite difficult to predict and/or reproduce the CoF values in films and laminates due to innumerous factors such as low thermal stability and interaction with other additives present in the polymer, adhesives and printing inks.

It will be worth pointing out that in addition to the amides that belong in the class of migratory slip agents, there is also the use of silicones of high molecular weight, that are classified as non-migratory slip agents. Comparatively to the amides, the silicones are noteworthy for their greater thermal stability, their capacity for immediate reduction of the CoF values after extrusion, but on the other hand they are less effective in achieving low CoF values and may entail organoleptic restrictions.

In the market of flexible films used in the automated packaging industry there is a significant need to develop a formulation that may allow the manufacture of films with low CoF values, and particularly that such formulation be able to maintain constant the values of this property. Currently, even when there are actually achieved CoF values below 0.35, there occurs an increase in those values following the processes of lamination, transportation and storage, and when this occurs, it becomes necessary to apply over the surface of the film a solution rich in slip agents in order to reduce the CoF values. However, the same is not always effective, and when this occurs the use of the film is rendered unfeasible.

During the production of the film, as well as after the processing thereof, there usually occurs an increase in the CoF values, which often reach values ≥0.35, which is inappropriate for use on the automated packaging industry due to the adhesion dragging of the film on the metallic surfaces. What would be ideal would be that, after a period of 24 hours following the extrusion of the film, the CoF values would amount to ≤0.35 and managed to stay constant within that range.

However, there are innumerous factors that contribute to the increase in the CoF values. During the extrusion, the increase in the CoF values occurs due to the loss/degradation of the slip additive due to the low thermal stability thereof at the temperatures used for obtaining the film.

During printing there also commonly occurs an increase in the CoF values due to the interaction between the slip additives and the pigments and/or solvents present in the printing inks. The corona treatment, performed on the surface of the film to allow the adhesion of the printing ink, also contributes to the increase of the CoF values and this occurs due to the low stability of the slip additives relatively to the electric discharge. It is pointed out that in adhesively laminated films, in addition to these interferences, there is one further strong aggravating factor that is the interaction between the slip additives and the lamination adhesive, both having polar characteristics. Finally, the increase in the CoF values occurs after the production of the film due to the high temperatures reached during transportation, storage and use in the automated packaging industry, this being caused by the increase in mobility of the amide, and its consequent preferential migration to the adhesive layer due to its greater chemical affinity therewith.

In spite of the critical aspect of the application and the volume of resin used by the industry, there is noted the existence of very few studies aiming to deal with this fault in performance. In this regard, the most recent studies are focused on the use of silicones of high molecular weight, whose restrictions were mentioned above herein. In a very reduced scale there are developments involving the use of amides with chemical structures that are alternative to those of the primary amides, and it will be worth pointing out that in most cases the same are aimed at the obtainment of properties that are alternative with regard to the reduction of the CoF values.

U.S. Pat. No. 3,266,924 relates to a usual application which consists in the joint use of anti-blocking additives and slip agents, more specifically primary amides of fatty acids, for the purpose of easing the slip of the film and minimizing blocking. The blocking occurs when two faces of very thin plastic films come into contact with one another, presenting a certain degree of resistance to separation. The anti-blocking additives act by way of a physical process, reducing the area of contact between the surfaces, and therefore the adherence between the films. It will be worth pointing out that the solution proposed in U.S. Pat. No. 3,266,924 is part of the prior art and presents as a disadvantage the increase of CoF, particularly after processes of printing and lamination of the film.

U.S. Pat. No. 3,647,738 comprehends a polymer composition characterized by providing films with low friction coefficient, low blocking and without occurrence of migration of the slip agent to the surface by means of the incorporation of 0.01-5.0% by weight of a secondary amide of generic formula R—NH—C=O—R'—OH, wherein R is an alkyl radical with 18 to about 22 carbon atoms and R' is a divalent hydrocarbon radical containing 3-15 carbon atoms. The amides cited in this patent are not usually cited in references in the literature, nor are they used in the industry. Since there is referred the isolated use of secondary erucamide, the proposed solution presents as a limitation a low performance in terms of reduction of the CoF values, particularly in the cases in which this reduction should be achieved at mot 48 hours after the extrusion of the film.

U.S. Pat. No. 5,498,652 discusses the use of amides, more specifically of the omega-acetoxy type of generic formula $CH_3$—COO—$(CH_2)_7$CONHR$_3$ for use in polyolefins. In this case, the document describes the improved performance relative to the slip capacity of the film (reduction of the coefficient of friction), and also the promotion of better adhesion of printing inks, particularly water-based printing inks. This solution, as in the preceding case, is not usually cited in the literature nor used in the industry. As it is a case of isolated use of secondary erucamide, most probably the proposed solution suffers from the limitation of a low performance in terms of reduction of the CoF values, particularly in the cases in which this reduction should be achieved at lost 48 hours after extrusion of the film.

U.S. Pat. No. 6,497,965 B1 describes the use of bi amides on the outer layer of polypropylene (PP) films), which printing process is realized by rotogravure. As prior art for PP resins there is cited the use of erucamide and behenamide on the outer layer of films printed by rotogravure, and there is presented as constituting inventive step the use of bis amide, more specifically ethylene bis amide (EBO) in this layer. The use of EBO on the external surface is intended to minimize the problems usually observed in processes of impression by rotogravure and the better performance of the EBO is attributed to the absence of deposition thereof on the "doctor blade". In this manner there is obtained a better printing quality and a lesser number of interruptions for shutdown and cleaning the printing equipment.

Still considering U.S. Pat. No. 6,497,965 B1, it is important to point out that, according to that document, PP films containing the primary amides erucamide and behenamide, which are cited in the prior art, evidence CoF values between 0.15 and 0.35, while the films additivated with EBO evidence CoF values between 0.15 and 0.45. The broader range of CoF for the firm additivated with EBO is coherent with the fact that this additive evidences a molecular weight practically twice as great as that of the primary amides, however this increase in the CoF values is deleterious to the automated packaging industry.

U.S. Pat. No. 7,267,862 B1 discusses the joint use of primary and secondary amides in low-thickness coextruded films, which may or not be laminated with another film of polyolefin, polyamide or polyester. The inventive step is pointed out to consist in the specific use of slip agents in determined proportions and levels. In the field of the claims, the application is extended to mono-extruded or coextruded, either or not laminated, there being pointed out a better performance when one of the layers contains a 1:1 blend of the secondary amides oleyl palmitamide and stearyl erucamide, additionally in the presence of 25 to 5000 ppm of a primary amide of generic formula R—$CONH_2$. However, the application of this patent extends to films containing 25 to 5000 ppm of primary amide of generic formula R—$CONH_2$ and, at least, one secondary amide of the type R—CO—NH—R'. It will be worth pointing out that among the eight examples of films cited in this patent only in three of them there is set forth the comparative analysis of the CoF values obtained for films additivated with erucamide. Furthermore, the formulation in development presents, in relation to the pattern additivated with erucamide, higher CoF values, which is undesirable in the majority of applications in the automated packaging industry.

Still regarding U.S. Pat. No. 7,267,862 B1 it will be worth pointing out that the additives oleyl palmitamide and stearyl erucamide have a regulatory limitation due to the fact that they are not contemplated in ANVISA[1] Resolution No. 105, dated May 19, 1999, and RDC 17/08, which establishes the general provisions for packages and equipment made of plastic material in contact with foodstuffs. In Brazil this renders unfeasible the use of formulations indicated in U.S. Pat. No. 7,267,862 B1 for use in packages that come into contact with foodstuffs, and this is one of the main applications in the industry of flexible films.

[1] Translator's note: ANVISA is the acronym for the Brazilian Health Supervision Agency [Agência Nacional de Vigilância Sanitária]

Based on this search of the literature realized in a patent database it is noted that the prior art contemplates the joint use of primary and secondary amides having specific structures. However, the existing studies are not related to the reduction of the CoF values (U.S. Pat. No. 6,497,965 B1) or present some limitations in the sense of achieving low CoF values and/or present limitations in terms of approval for use in contact with foodstuffs (U.S. Pat. No. 7,267,862 B1).

On analyzing the performance of the amides in the reduction of the CoF values it is necessary to take into account the molecular weight, the presence of unsaturated bonds and the structure itself: primary amide, secondary amide or secondary amide of the bis amide type.

By means of a comparative analysis between the performances of the amides in the reduction of the CoF values, it is noted that the unsaturated amides (oleamide and erucamide) have a superior performance with relation to the corresponding saturated amides (behenamide and stearamide). On the other hand, the saturated amides evidence a better performance in blocking reduction and greater thermal stability.

The presence of the unsaturated bond impacts the migration ability, and mostly, the form in which the same crystallizes on the surface of the film. Comparative studies between the erucamide and the behenamide with the use of AFM (Atomic Force Microscopy or Scanning Force Microscopy) show differences between the crystalline structures formed on the surface of the film. The better efficiency of the erucamide in reducing the CoF values is related to the fact that its crystalline structure is larger, flatter and less rigid, favoring the slipping thereon and therefore reducing the CoF values.

The molecular weight of the amide impacts the migration velocity thereof and its thermal stability. The greater the molecular weight, the slower will be the migration velocity of the amide, and consequently the lesser will be the velocity and capacity of reduction of the CoF values.

As previously cited, the isolated use of the secondary amides is not effective for reducing the CoF values such as to fulfill the needs of the automated packaging industry.

In turn, the secondary amides of the bis amides type have as their main application the use in Ethylene-vinyl acetate resins as an "anti-tack" [anti-grip] agent. This application is in the public domain, and in such connection there may be cited as an example the patent RE. 32.325—Tack Free Polymer Pellets.

In this connection, in order to facilitate the slip of the films in the processes of printing, lamination and automatic packaging there are basically used in the prior art primary amides of the types erucamide, oleamide and behenamide, and secondary amides of the types oleyl palmitamide and stearyl erucamide.

The available solutions present limitations in the sense of generating flexible films with low CoF values (lower than 0.35) and, particularly, of generating films capable of maintaining the CoF values under control after the lamination process and after exposure to critical conditions (time and temperature) of transportation and/or storage in the automated packaging industry. This invention is intended to fulfill this problem of performance.

SUMMARY OF THE INVENTION

The solution proposed in the present invention contemplates the use of a mixture of slip agents that, in adequate proportions, is intended to fulfill the gap in performance currently existing in the segments of flexible films. More specifically, the inventiveness of this invention is related to the joint use of the slip additives of the primary amide type and secondary amide of the bis amide type. In the following there are presented various examples elucidating the synergistic effect between these additives towards obtaining low CoF values, even after lamination and storage, including in critical conditions of temperature, aiming to simulate harsh conditions of transportation and/or storage in the automated packaging industry.

This is a differentiated solution that, in addition to meeting the requisites of the application in terms of reduction of the CoF value, also meets the requisites of the ANVISA agency for use in films that come into contact with foodstuffs. The prior art does not contemplate the use of secondary amides of the bis amides type for this purpose, nor does it contemplate the joint use thereof with primary amides.

DETAILED DESCRIPTION

Figure 1:
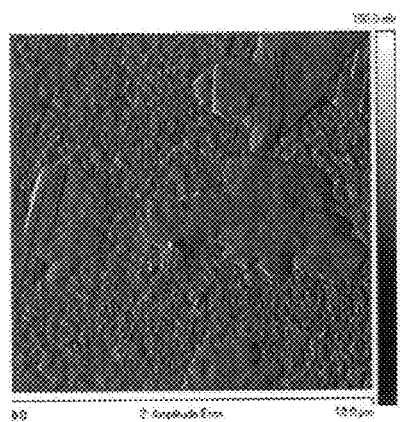
FIG. 1 presents the image obtained by Atomic Force Microscopy (AFM) of the structure of the secondary amide (R—CO—NH—R') on the surface of a linear low-density polyethylene (LLDPE) film.

The present invention refers to a thermoplastic resin composition that comprises a mixture of slip agents consisting of:

a) 0.0001% to 10% by weight, based on the total weight of the thermoplastic resin composition, of a primary amide with the generic formula R—CO—NH$_2$, wherein R is an alkyl radical containing between 18 and 22 carbon atoms; and b) 0.0001% to 10% by weight, based on the total weight of the thermoplastic resin composition, of a secondary amide of the bis amide type of the generic formula R'—CO—NH—CH$_2$—CH$_2$—NH—CO—R", wherein R' and R" are alkyl radicals containing between 18 and 22 carbon atoms, wherein R' and R" may be the same or different. Preferably, R, R' and R" are alkyl radicals containing 18 carbon atoms.

The present invention also relates to the use of the said thermoplastic resin composition (hereinafter also designated as additivated resin) for the production of articles, preferably mono-extruded or coextruded films, either or not laminated, wherein the resin is present on at least one of the layers thereof, or any other product that may require a CoF value <0,35.

The thermoplastic resin according to the present invention is preferably a polyolefinic resin, more preferably a resin of polyethylene or polypropylene.

In one of the modalities of the present invention, the thermoplastic resin is a resin obtained from a renewable natural source, certified regarding its renewable carbon content by means of determination in accordance with the methodology described by the technical standard ASTM D 6866-06, "*Standard Test Methods for Determining the Biobased Contents of Natural Range Materials Using Radiocarbon and Isotope Ratio Mass Spectrometry Analysis*".

Tests having been conducted indicated that, on employing a 1:1 ratio between the additives (slip agents) a) and b), it is possible to obtain a better control of CoF after lamination, however the CoF values remain less than ideal for use in the automated packing industry. The best performance in terms of control of the CoF and obtainment of appropriate values is achieved when employing levels of additive b) about 50% higher than those of additive a). The suggested levels of a) and b) vary between 0.0001% and 10% by weight, with the best performance having been observed when employing a level of a) preferably between 0.03 and 0.15% by weight, and a level of b) between 0.05 and 0.25% by weight.

Polyolefin resins containing this composition stand out by their capacity of originating films with CoF values lower than 0.35, and particularly by maintaining these values adequately controlled for use in the automated packaging industry. In this regard, the presence of the primary amide warrants low initial values of CoF due to the low molecular weight and due to its capacity to rapidly migrate to the surface of the film, while the secondary amide of the bis amide type warrants the maintenance of the CoF even after lamination and/or exposure of the film to high temperatures due to its greater thermal stability, less interaction with the lamination adhesives, and particularly due to the peculiar characteristics of the crystalline structure formed on the surface of the film.

The secondary amides and the secondary amides of the bis amide type have in common the characteristics of high molecular weight and good thermal stability. However, as illustrated in the chemical formulae to follow, the secondary amides of the bis amide type have two amide groups, while the secondary amides and the primary amides have only one amide group per molecule.

Secondary amides
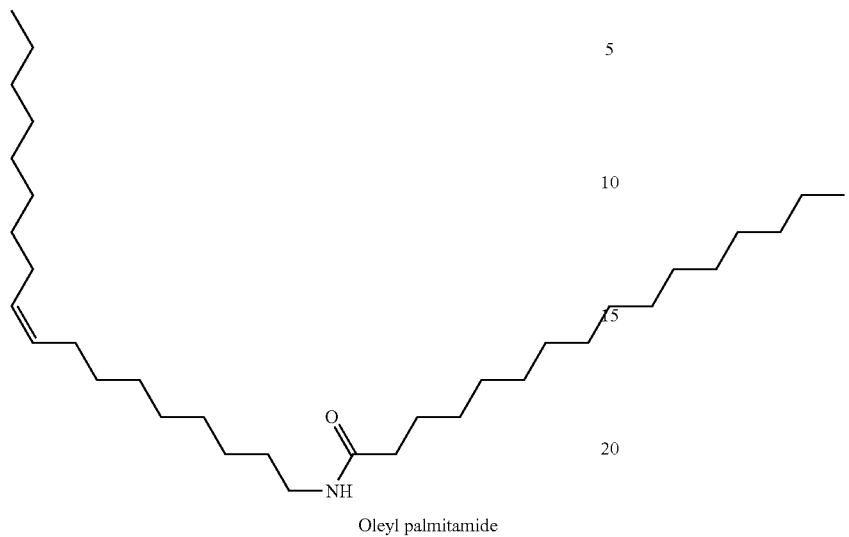
Oleyl palmitamide
Stearyl erucamide
Secondary amides-bis amides
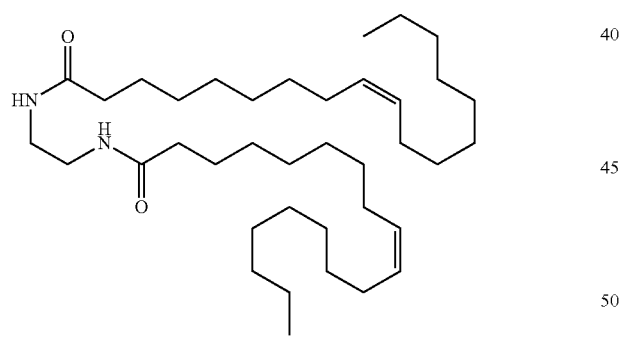
Ethylene bis oleamide
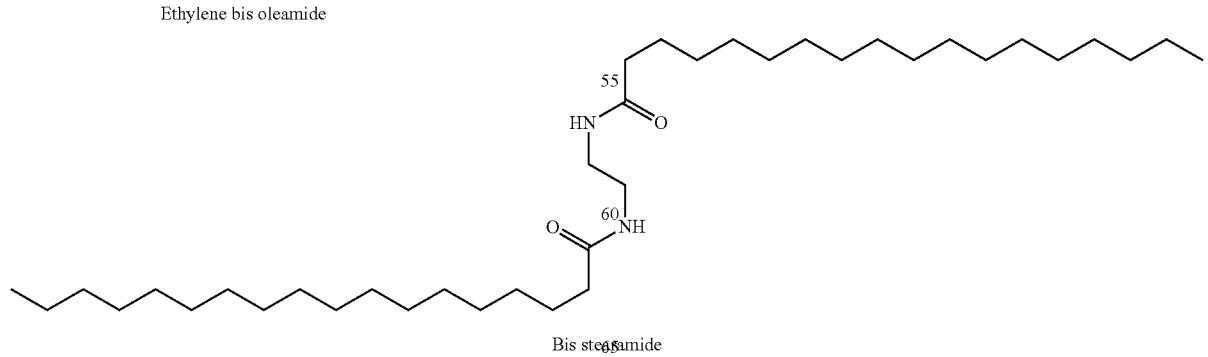
Bis stearamide The group NH evidences a polar characteristic and the presence of this group in the amide renders the same incompatible with the polyolefinic resins, which evidence a non-polar characteristic. Due to this difference of polarity between the amide and the polyolefins, after the extrusion of the film, there occurs a reduction of the solubility of the amide while the polymeric mass cools, and consequently there occurs the migration and the crystallization of the amide on the surface of the film.

Figure 2:
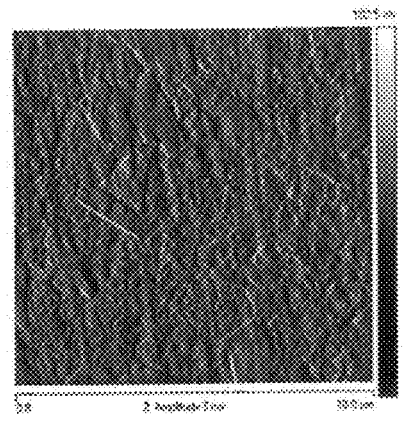
FIG. 2 presents the image obtained by AFM microscopy of the structure of the secondary amide of the bis amide type (R—CO—NH—CH$_2$—CH$_2$—NH—CO—R') on the surface of a LLDPE film.

One important fact is that the crystallization of the amide occurs in an organized form with the consequent formation of hydrogen bonds between the molecules. When there occurs the deposition of the first molecules of amide, the NH group stays on the surface of the film and coordinates the deposition of the subsequent molecules by means of the formation of hydrogen bonds. Comparatively to the primary and secondary amides, the fact that the secondary amides of the bis amide type present a greater number of NH groups increases the number of bonds between the molecules of the additive, rendering the same more efficient with regard to the ability to reduce the CoF values as well as with regard to maintaining these values under control due to the greater stability of the formed structure. FIGS. 1 and 2, that are relative to images obtained by Atomic Force microscopy (AFM), allow a comparative observation of the differences between the structures of the secondary amides and secondary amides of the bis amide type on the surface of a linear low density polyethylene film.

EXAMPLES

1st Example

Monolayer PE Film

The purpose of this evaluation was to establish a comparative analysis between films additivated with erucamide (a primary amide) and/or EBO (a secondary amide of the bis amide type). The Sample A contains erucamide, and Samples B and C contain different contents of EBO, while Samples D and E contain the joint use of these additives in different proportions.

Figure 3:
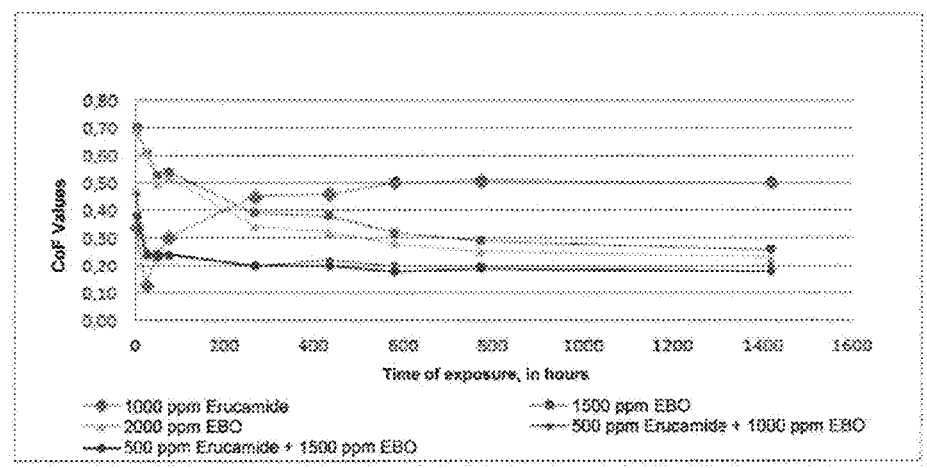
FIG. 3 presents, by means of a graphic, the influence of time on the CoF values in the samples from the 1$^{st}$ Example.
Figure 4:
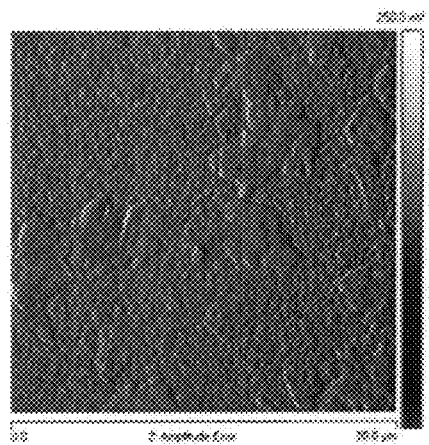
FIG. 4 presents the image obtained by AFM microscopy of the structure of the Erucamide on the surface of a LLDPE film.
Figure 5:
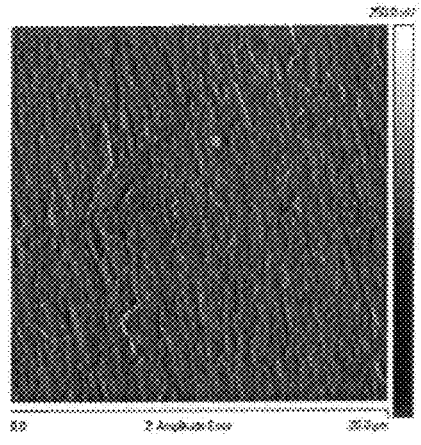
FIG. 5 presents the image obtained by AFM microscopy of the structure of Erucamide with EBO on the surface of a LLDPE film.
Figure 6:
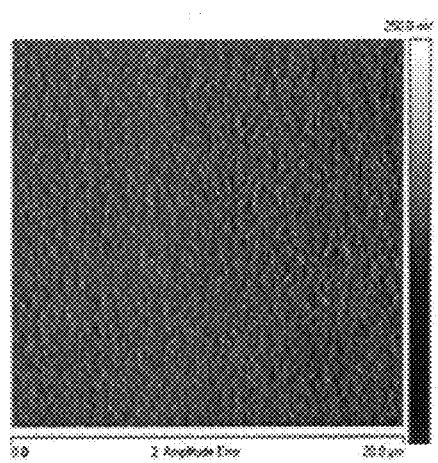
FIG. 6 presents the image obtained by AFM microscopy of the structure of Erucamide on the surface of a LLDPE film after exposure to temperatures of 60° C.
Figure 7:
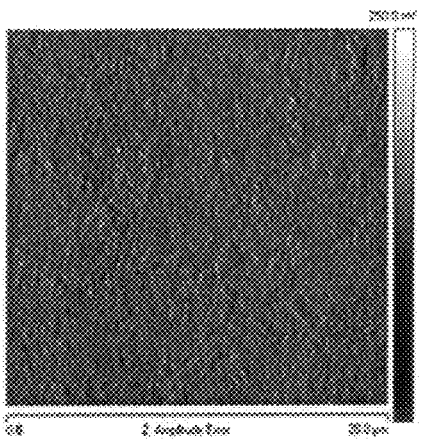
FIG. 7 presents the image obtained by AFM microscopy of the structure of Erucamide with EBO on the surface of a LLDPE film after exposure to temperatures of 60° C.

In the graph of FIG. 3 there are presented in illustrative form the CoF results cited in Example 1 of this patent. It is noted that the joint use of the primary amide (erucamide) with the secondary amide of the bis amide type (EBO) evidences a differentiated effect, being able to achieve the requisites of the automated packaging industry, that are CoF values ≤0.35 upon 24 hours of extrusion of the film, as well as achieving the stability of the same during the observation period of 58 days (1,400 hours).

In terms of CoF, it is noted that the isolated addition of EBO does not allow the achievement of satisfactory values, while the isolated addition of erucamide shows a tendency towards an increase in the CoF values upon 48 hours of extrusion. The joint use of erucamide and EBO promotes a synergistic effect in terms of reduction and stabilization of the CoF, and among the formulations having been tested, it is noted that the one containing a ratio of erucamide to EBO of 1:2 evidenced a cost/benefit relationship that was superior to that in which the ratio between these components is 1:3.

With regard to blocking and optical properties there were not noted any significant differences between the formulations having been tested.

Having in view that the most significant increase in the CoF values occurs after lamination of the film and during storage at the final user, the CoF results cited in Examples 2 to 5 were obtained in film samples under the following conditions:
  printed and adhesively laminated, for the purpose of contemplating the influence of the printing inks and of the lamination adhesive;
  placed in conditions of high temperature (60° C.), aiming to simulate critical conditions of transportation and/or storage. In this connection, the CoF values were monitored in samples after 24, 48 and 72 hours of exposure to heat (60 C).

TABLE 2

Properties of the resins used in the production of the films cited in Examples 2 to 5.

| | |
|---|---|
| LLDPE with erucamide | metallocene catalyst, MFR 190/2.16 = 1.0 g/10 min., density = 0.917 g/cm³, hexene comonomer, slip agent: 800 ppm of erucamide. |

TABLE 1

Monolayer film, thickness of 30 microns, LLDPE resin, ZN catalyst, MFR 190/2.16 = 1.0 g/10 min., density = 0.917 g/cm³, butene comonomer.

| Samples | Characteristics | Film samples | | | | |
|---|---|---|---|---|---|---|
| | | A | B | C | D | E |
| Composition | Erucamide, content in ppm | 1000 | | | 500 | 500 |
| | Ethylene bis oleamide, content in ppm | | 1500 | 2000 | 1000 | 1500 |
| Properties | IMMEDIATE BLOCKING | 6 | 8 | 7 | 8 | 8 |
| | COLD BLOCKING | 4 | 7 | 4 | 6 | 5 |
| | HOT BLOCKING | 4 | 10 | 5 | 4 | 4 |
| | GLOSS 60° FILM | 76.3 | 68.8 | 63 | 77.7 | 76.3 |
| | OPACITY FILM | 16.3 | 19.9 | 19.7 | 16.3 | 20 |
| | CLARITY FILM | 94.7 | 94.6 | 94.2 | 94.6 | 94.2 |
| | CoF EXT/EXT IMMEDIATE | 0.34 | 0.70 | 0.69 | 0.46 | 0.38 |
| | CoF EXT/EXT 24 h | 0.13 | 0.61 | 0.61 | 0.25 | 0.24 |
| | CoF EXT/EXT 48 h | 0.24 | 0.53 | 0.49 | 0.23 | 0.24 |
| | CoF EXT/EXT 72 h | 0.30 | 0.54 | 0.52 | 0.24 | 0.24 |
| | CoF EXT/EXT 264 h | 0.45 | 0.39 | 0.34 | 0.20 | 0.20 |
| | CoF EXT/EXT 432 h | 0.46 | 0.38 | 0.32 | 0.22 | 0.20 |
| | CoF EXT/EXT 576 h | 0.50 | 0.32 | 0.28 | 0.20 | 0.18 |
| | CoF EXT/EXT 768 h | 0.51 | 0.29 | 0.25 | 0.20 | 0.19 |
| | CoF EXT/EXT 1416 h | 0.50 | 0.26 | 0.23 | 0.20 | 0.18 |

TABLE 2-continued

Properties of the resins used in the production of
the films cited in Examples 2 to 5.

| | |
|---|---|
| LLDPE with erucamide + EBO | metallocene catalyst, MFR 190/2.16 = 1.0 g/10 min., density = 0.917 g/cm³, hexene comonomer, slip agents: erucamide and EBO in the proportion of 4:7. |
| LDPE with erucamide | MFR 190/2.16 = 2.7 g/10 min., density = 0.923 g/cm³, slip agent: 500 ppm of erucamide. |

2$^{nd}$ Example

Coextruded PE Film Laminated With its Own Structure (A/A/A//A/A/A)

The purpose of this evaluation was the establishment of a comparative analysis between LLDPE resins containing erucamide (sample F) and containing erucamide+EBO (sample G). For this purpose there were produced films using a mixture of 80% LLDPE with 20% LDPE in the three layers A/A/A, and the film was laminated with the same structure using medium performance adhesive. The total thickness was 60 microns.

As already cited, the laminate samples were placed in an oven at a temperature of 60° C. and there was performed the monitoring of the CoF values determined on the internal/internal surface after 24, 48 and 72 hours of exposure.

TABLE 3

Values of CoF int/int in samples of laminates A/A/A//A/A/A.
Each layer A contains 80% LLDPE mixed with 20% LDPE.

| Time of permanence in the oven at 60° C., in hours | Sample F | Sample G |
|---|---|---|
| 0 | 0.15 | 0.12 |
| 24 | 0.36 | 0.14 |
| 48 | 0.46 | 0.15 |
| 72 | 0.43 | 0.13 |

In the 2$^{nd}$ example, for the structure of the film PE/PE (A/A/A//A/A/A) which thickness is 72 microns, the CoF value obtained for the laminates placed in conditions of ambient temperature was 0.12 for Sample G and 0.15 for Sample F. After permanence at 60° C., Sample G maintained the CoF values below 0.16, while in Sample F the CoF values reached values of more than 0.40.

3$^{rd}$ Example

Coextruded Film of PE Laminated With Its Own Structure (A/A/A//A/A/A)

This evaluation was conducted for the purpose of evaluating the capacity of the LLDPE additivated with erucamide+EBO to maintain the CoF values under control, as well as to check its performance in mixture with resins additivated with erucamide. For this purpose there were produced films coextruded and laminated with their own structure (A/A/A//A/A/A). The film was laminated with medium performance adhesive and the total thickness was 72 micron.

The following is a description of the composition used in the layers A:

Sample H—produced with 77% LLDPE with erucamide, 20% LDPE and 2% of mixture of slip agents and 1% of mixture of anti-blocking agents. Furthermore, there was added 1% of amide in the printing ink;

Sample I—produced with 50% of LLDPE with erucamide+EBO, 30% of LLDPE with erucamide and 20% of LDPE. It is pointed out that in this case there was neither used a mixture of slip agent nor was there used amide in the printing ink.

TABLE 4 properties evaluated in samples of laminates (A/A/A//A/A/A).

| Properties | Sample H | Sample I |
|---|---|---|
| Gloss at 45° | 78 | 83 |
| Gloss at 60° | 117 | 125 |
| Opacity | 12 | 7.6 |
| CoF int/int - film accommodated at 23° C. | 0.20 | 0.25 |
| CoF int/int - film accommodated at 60° C. for 72 hours | 0.35 | 0.24 |

The laminate identified as Sample I evidenced better optical properties, higher gloss and lesser opacity.

After exposure to heat, the laminate indentified as sample I maintained its CoF value near 0.24 after 72 hours of exposure. However, as observed in the 2$^{nd}$ example in Sample H there was observed a significant increase in the CoF values, which reached 0.35 after 72 hours of exposure. This increase in the CoF values is undesirable and renders the use of this film unfeasible for automated packaging processes.

4$^{th}$ Example

Coextruded Film (A/B/B) Laminated With One Other Coextruded Film (B/B/B)

The purpose of this evaluation was to provide a comparative evaluation between the performance of the LLDPE with erucamide (sample J) and the LLDPE with erucamide+EBO (sample K) in structures laminated with PE, however only altering the LLDPE of layer A. That layer contains 78% of LLDPE resin mixed with 20% of LDPE and 2% of mixture of slip agent. The film was laminated with medium performance adhesive and the total thickness thereof was 60 microns.

TABLE 5

Film A/B/B laminated with B/B/B. Layer A with 78% of LLDPE mixed
with 2% of mixture of slip agent and 20% of LDPE.

| CoF INT/INT time of exposure in hours | Sample J | Sample K |
|---|---|---|
| 0 | 0.13 | 0.12 |
| 24 | 0.36 | 0.20 |
| 48 | 0.35 | 0.24 |
| 72 | 0.41 | 0.20 |

At ambient temperature, the CoF values obtained for both laminates were equal to 0.12. After exposure to heat, the film identified as Sample K reached CoF values near 0.20, while in the film identified as Sample J the CoF values were superior to 0.40, after 72 hours of exposure.

5$^{th}$ Example

Coextruded PE Film Laminated With PET (A/A/A//PET)

The purpose of this evaluation was to evaluate the performance of the LLDPE with erucamide (sample L) and containing erucamide+EBO (sample M) in structures laminated with PET. For this purpose, there were produced films using a mixture of 80% of LLDPE with 20% of LDPE in the layers A/A/A, which were laminated with PET. The films were laminated with high-performance adhesive and the total thickness of the laminates was 70 micron.

As already mentioned, for the purpose of simulating critical conditions of transportation and storage, the laminate samples were placed in an oven at a temperature of 60° C. and the CoF values were monitored after 24, 48 and 72 hours of exposure.

TABLE 6

Laminate A/A/A with PET. Layers A/A/A with 80% of LLDPE mixed with 20% of LDPE.

| CoF | Time of exposure at a temperature of 60° C. | Sample L | Sample M |
|---|---|---|---|
| INT/INT | 0 | 0.17 | 0.17 |
|  | 24 | 0.37 | 0.16 |
|  | 48 | 0.36 | 0.18 |
|  | 72 | 0.34 | 0.15 |
| EXT/EXT | 0 | 0.25 | 0.23 |
|  | 24 | 0.26 | 0.28 |
|  | 48 | 0.25 | 0.26 |
|  | 72 | 0.32 | 0.23 |

The values of CoF INT/INT obtained in samples placed at ambient temperature were equal to 0.17 for both laminates. After exposure to heat, the laminate identified as Sample M maintained the CoF value near 0.15, while the laminate identified as Sample L reached values in excess of 0.34 during the 72 hours of exposure.

With relation to the outer layer (PET), the values of CoF EXT/EXT obtained for the laminate identified as sample M were near 0.25 during the 72 hours of exposure. In turn, in the film identified as Sample L there is observed a tendency to an increase in the values, which eventually reach 0.32 after 72 hours of exposure to the heat.

The tests having been conducted indicated that the LLDPE resin with erucamide+EBO evidences an excellent performance for use in adhesively laminated films that require control of the CoF value. Samples of films produced with this formulation evidence low CoF values and better control of this property after the lamination, as well as after exposure to heat aiming to simulate critical conditions of transportation and storage.

It will be worth pointing out that notwithstanding the difference observed in the form of crystallization of the bis amide the same is not indicated for use as a slip agent in the automated packaging industry, due to the difficulty in migrating, and consequently the obtainment of high CoF values, as shown in Example 1 of the instant patent application. Comparatively to the primary amides, the lesser efficiency of the bis amides in the reduction of the CoF values is related to the higher molecular weight, and consequently to the difficulty of migration of large molecules.

The studies conducted within the scope of the instant patent application demonstrated that the joint use of a primary amide with a secondary amide of the bis amide type evidences a differentiated and synergistic effect, which meets the requisites of the automated packaging industry, that are CoF values ≤0.35 after 24 hours of processing (a characteristic provided by the primary amide), and also the maintenance thereof after the lamination and/or the exposure to high temperatures reached during transportation and storage (the synergistic effect of the primary amide and the bis amide).

In FIGS. 4, 5, 6 and 7 there are presented images obtained by AFM microscopy, whereby it is possible to realize a comparative analysis between the use of the erucamide and the joint use of erucamide and a secondary amide of the bis amide type, according to the scope of the instant patent application. On utilizing the erucamide, there is observed the formation of a large and heterogeneous crystalline structure, similar to that previously described for the secondary amides. On the other hand, when using the erucamide with a secondary amide of the bis amide type, there occurs the formation of a differentiated crystalline structure, with smaller and more homogenous crystals. The analysis of these films, after exposure in an oven at 60° C. aiming to simulate the transportation and storage conditions, evidences the instability of the structure formed with the use of the erucamide, which does not occur with the joint use of the erucamide with ethylene bis amide (EBO), and for this motive the latter is capable of maintaining the stability of the CoF values.

It will be worth pointing out that the secondary amides of the bis amide type are the only structures that contain two NH groups per molecule, and this allows the formation of a more stable and differentiated crystalline structure, which is the result of the formation of a higher number of hydrogen bonds with oxygen from another molecule.

The object of the present invention is to secure protection for the joint use of slip agents of the primary amide type and secondary amide of the bis amide type in thermoplastic resins, as well as the use thereof in final applications which composition contains this thermoplastic resin, even if in a small amount. That is, the invention comprises any product in the form of a film or article which final composition, expressed as a weight percentage, contains from 0.0001% to 10% of a primary amide of generic formula R—CO—NH$_2$ and from 0.0001% to 10% by weight of a secondary amide of the bis amide type with the generic formula R'—CO—NH—CH$_2$—CH$_2$—NH—CO—R".

The invention claimed is:

1. A thermoplastic resin composition comprising a mixture of slip agents, including:
   a) 0.0001% to 10% by weight, based on the total weight of the thermoplastic resin composition, of a primary amide of generic formula R—CO—NH$_2$, wherein R is an alkyl radical containing between 17 and 22 carbon atoms; and
   b) 0.0001 to 10% by weight, based on the total weight of the thermoplastic resin composition, of a secondary amide of the bis amide type of generic formula R'—CO—NH—CH$_2$—CH$_2$—NH—CO—R", wherein R' and R" are alkyl radicals containing between 17 and 22 carbon atoms, wherein R' and R" are the same or different, and wherein the content of additive b) is at least 50% by weight higher than the content of additive a) by weight.

2. The thermoplastic resin composition as recited in claim 1, wherein R, R' and R" are alkyl radicals containing 18 carbon atoms.

3. The thermoplastic resin composition as recited in claim 1, comprising a content of additive b) 50% higher than the content of additive a) by weight.

4. The thermoplastic resin composition as recited in claim 1, comprising a content of additive a) between 0.03 and 0.15% by weight, and a content of additive b) between 0.05 and 0.25% by weight.

5. The thermoplastic resin composition as recited in claim 1, wherein the thermoplastic resin is a polyethylene resin or a polypropylene resin.

6. The thermoplastic resin composition as recited in claim 1, wherein the thermoplastic resin is a resin obtained from a renewable natural source.

7. A mono-extruded or coextruded, laminated or non-laminated film, wherein at least one of the layers thereof is prepared from a thermoplastic resin composition comprising a mixture of slip agents, including:
   a) 0.0001% to 10% by weight, based on the total weight of the thermoplastic resin composition, of a primary amide of generic formula R—CO—NH$_2$, wherein R is an alkyl radical containing between 17 and 22 carbon atoms; and
   b) 0.0001 to 10% by weight, based on the total weight of the thermoplastic resin composition, of a secondary amide of the bis amide type of generic formula R'—CO—NH—CH$_2$—CH$_2$—NH—CO—R", wherein R' and R" are alkyl radicals containing between 18 and 22 carbon atoms, wherein R' and R" are the same or different, and wherein the content of additive b) is at least 50% by weight higher than the content of additive a) by weight.

8. The film as recited in claim 7, having a coefficient of friction value lower than 0.35.

9. The film as recited in claim 8, wherein the value of the coefficient of friction is maintained even after lamination and storage and/or exposure to high temperatures.

* * * * *